Dec. 4, 1962 R. M. BECKER 3,066,874
CATALYST SPRAY GUN AND METHOD OF SPRAYING RESINS
Filed Oct. 5, 1960 3 Sheets-Sheet 1

INVENTOR.
RICHARD M. BECKER
BY
Meyer, Baldwin, Doran & Young
ATTORNEYS

Dec. 4, 1962  R. M. BECKER  3,066,874
CATALYST SPRAY GUN AND METHOD OF SPRAYING RESINS
Filed Oct. 5, 1960  3 Sheets-Sheet 2
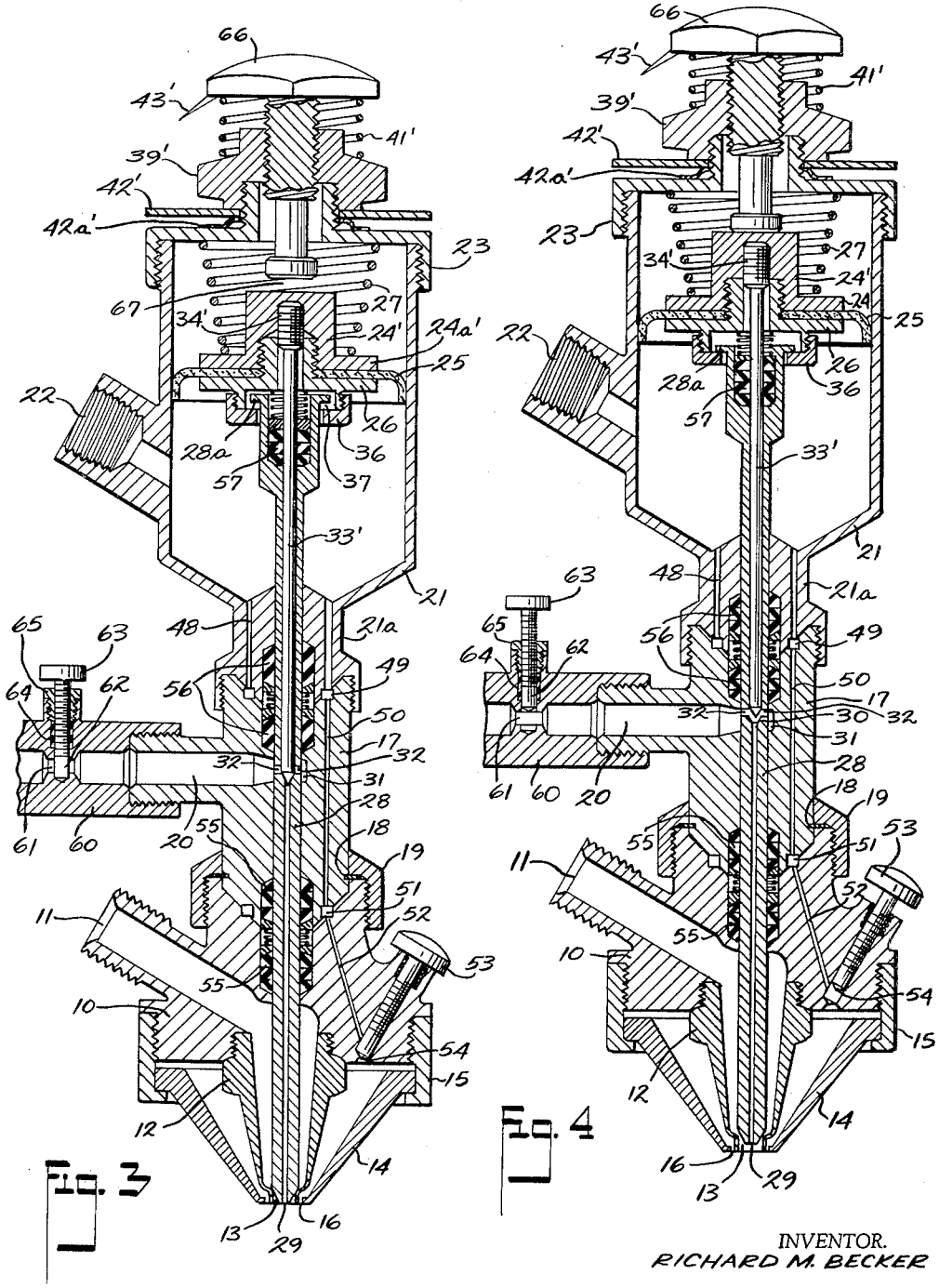
INVENTOR.
RICHARD M. BECKER
BY
Meyer, Baldwin, Doran & Young
ATTORNEYS Dec. 4, 1962  R. M. BECKER  3,066,874
CATALYST SPRAY GUN AND METHOD OF SPRAYING RESINS
Filed Oct. 5, 1960  3 Sheets-Sheet 3
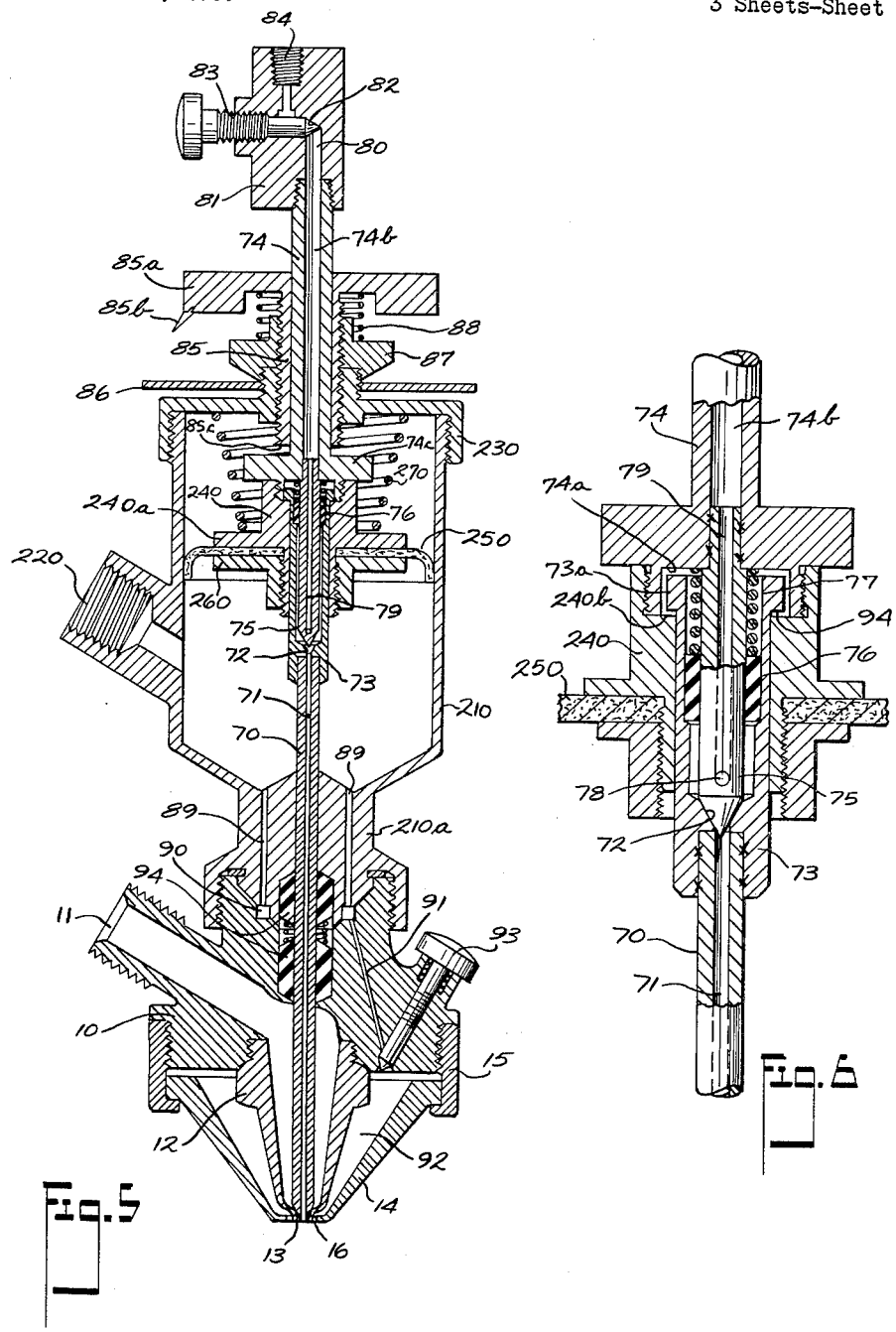
INVENTOR.
RICHARD M. BECKER
BY
Meyer, Baldwin, Doran & Young
ATTORNEYS 3,066,874
CATALYST SPRAY GUN AND METHOD OF
SPRAYING RESINS
Richard M. Becker, Willoughby, Ohio, assignor, by mesne assignments, to Ibis Enterprises Limited, Hamilton, Bermuda, a corporation of Bermuda
Filed Oct. 5, 1960, Ser. No. 60,691
10 Claims. (Cl. 239—415)

This invention relates to improvements in a spray gun for a plurality of fluids which are kept separate during their progress through the gun and are mixed only in the spray pattern as they leave the gun and before they are deposited on a desired surface. More particularly, the invention provides means located at the gun itself for quickly and accurately setting the rate of discharge of the various fluids whereby a critical ratio of the component fluids may be readily established and maintained, and may be readily reset for a repeat performance.

Synthetic resins are available today which may be readily deposited in desired forms and patterns to give exceptionally fine properties to the finished product. However, many of these resins require a catalyst or other additive to cause the material to set in its final form. Because of the quick reaction of this catalyst component, it is undesirable, or in some cases impossible, to mix the catalyst in the pot before spraying and the desired condition is to mix the catalyst with the basic material, such as resin, in the spray itself so that it sets immediately upon striking the surface where it is deposited. Sometimes, the ratio between the synthetic resin or base material and its catalyst or hardener is of such a critical nature that a relatively slight deviation from this critical ratio destroys the value of the work.

It is an object of the present invention to provide a spray gun for dispensing simultaneously a plurality of component fluids which are mixed only after they leave the spray gun, and wherein means are provided directly at the gun itself and under the immediate control of the operator for setting the rate of discharge of each of the component fluids separately, together with indicator means to show that the critical ratio is being maintained and to provide for quick resetting of critical ratios when desired.

Other objects and advantages of the present invention will be apparent from the accompanying drawings and description and the essential features thereof will be set forth in the appended claims.

This application is a continuation-in-part of my copending application Serial No. 20,454, filed April 6, 1960, now abandoned, for Catalyst Spray Gun and Method of Spraying Resins.

In the drawings—

FIG. 3 is a central sectional view through another embodiment of my invention showing the fluid component discharge orifices of the gun in closed condition;

FIG. 4 is a sectional view similar to FIG. 3 but showing the fluid component discharge ports open:

FIG. 5 is a central sectional view through still another embodiment of my invention; while FIG. 6 is an enlarged fragmental sectional view of parts associated with the piston in FIG. 5.

Figures 1, 2:
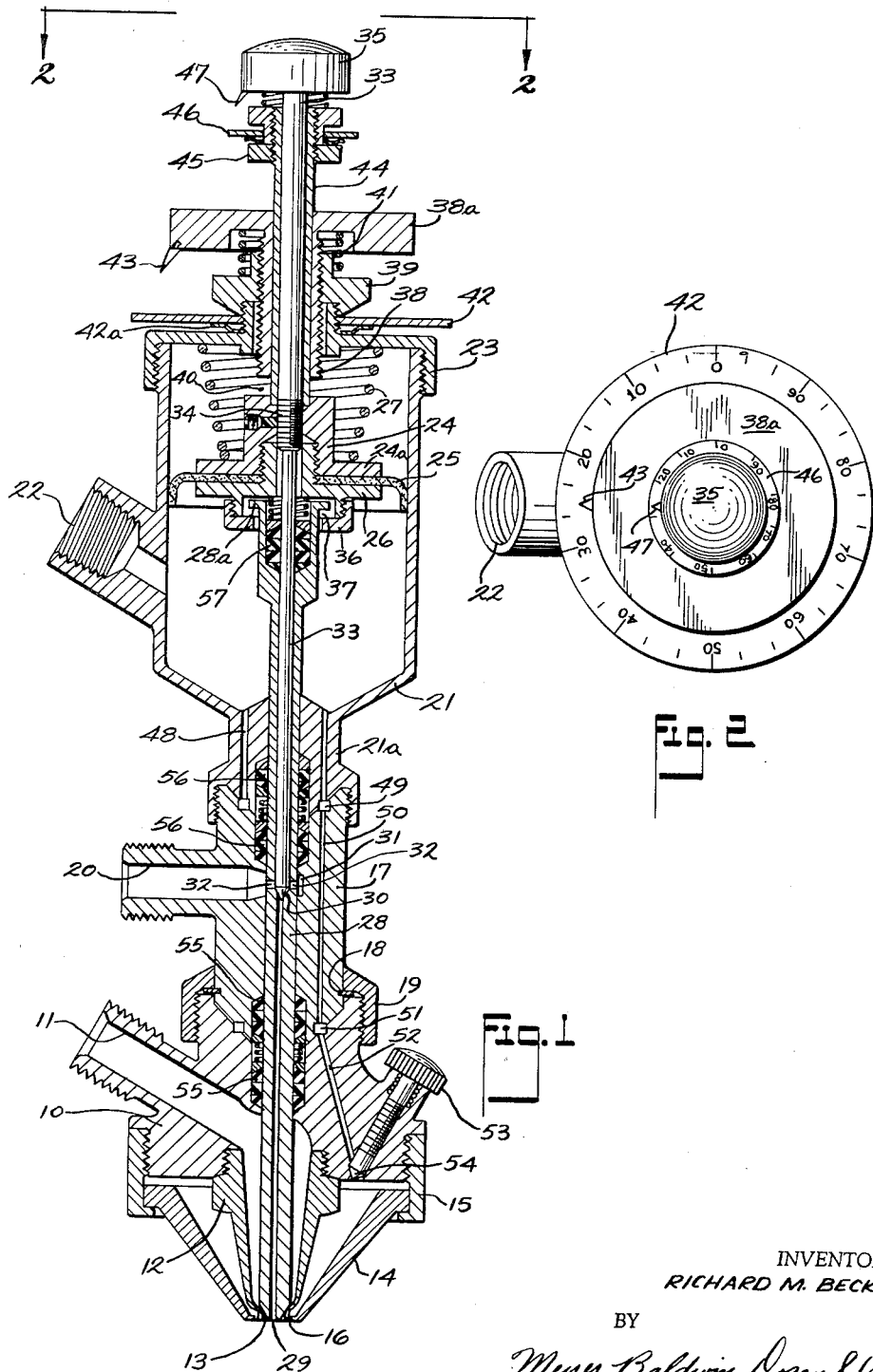
FIG. 1 is a central sectional view through one embodiment of my invention.
FIG. 2 is an end view of the device of FIG. 1 taken from the position of the line 2—2 of FIG. 1.

Referring now to FIGS. 1 and 2, a resin fluid body 10 is provided near the tip end of the gun and having a central opening communicating with a resin fluid supply passageway 11 which is fitted to receive a hose or the like through which resin may be fed to the gun under pressure as desired. A resin fluid tip 12 is threaded into the body 10 and has walls which taper forwardly in a somewhat conical fashion to terminate at the forward end thereof in a generally circular opening 13. A generally conical shaped air cap 14 is secured to the body 10 by means of the air cap nut 15. This air cap nut terminates in a generally circular opening 16 at its forward end, this opening being larger than the forward end of the tip 12 so as to provide an annular space for the discharge of air entirely around the resin fluid tip.

To the rear end of the resin fluid body 10 there is secured a catalyst fluid body 17 by means of retaining ring 18 and a cap nut 19. This body 17 is provided with a catalyst fluid supply passage 20 which is arranged for the connection of a hose or the like to feed catalyst to the gun under pressure as desired.

To the rear end of the catalyst body 17 a cylinder 21 is secured, as by threading the solid body portion 21a to the body 17. This cylinder is provided with an air inlet 22 arranged for the connection of an air hose or the like. The rear end of the cylinder is closed by the threaded cylinder cap 23. The cylinder is fitted with a piston comprising a piston nut 24 having a flange 24a lying on the rear side of a piston leather 25, on the other side of which is a disk 26 which has a hub threaded into the nut 24 so as to firmly hold the leather between them. A helical compression spring 27 lies between the cylinder cap 23 and the piston nut 24 so as to urge the piston forwardly when it is released from air pressure in the cylinder.

A central, axially extending cylindrical opening is provided through the bodies 10, 17 and 21a in alignment so as to receive a hollow needle 28. This needle is provided with an axially extending opening 29 of small diameter from the tip end thereof back to a needle valve seat 30 in the mid-portion of the catalyst fluid body 17 adjacent the catalyst inlet passage 20. At this point the needle is surrounded by an annular chamber 31 in the body 17 from which a plurality of openings 32 communicate with the hollow portion of the needle to permit the entrance of catalyst past the valve seat and down the passageway 29 when the needle valve is open. This needle valve 33 occupies a larger diameter bore in the needle 28 and extends through the piston nut 24 where it is increased in diameter and provided with a threaded connection with the nut 24 as indicated at 34 so that when a hand knob 35 fixed to the rear end of the needle valve 33 is turned, the threaded connection at 34 is adjusted to regulate the amount which the needle valve will leave its seat 30 when actuated as later described.

It is obvious that needle valve 33 will be lifted from its seat 30, through its threaded connection with the piston nut 24, when the piston is moved rearwardly by the introduction of air to the forward portion of cylinder 21 through passageway 22.

A second connection is provided with the piston for the operation of the hollow needle 28 by actuation of the piston. This comprises a collar nut 36 which is threaded to the disk 26 and provides an inwardly extending flange adapted to underlie the radially outwardly extending flange 28a at the rear end of the hollow needle 28. A lost motion is provided between the parts 36 and 28a as indicated at 37 so that the first movement rearwardly of the piston will lift the needle valve 33 off its seat 30, and quickly thereafter nut 36 will engage flange 28a to move the hollow needle rearward so as to open up an annular opening at the tip end of the hollow needle between the end of the needle and the fluid tip 12.

Means is provided to limit the rearward movement of the piston so as to control the opening of the needle 28 and of the needle valve 33. This is an abutment which is provided by the hollow stem 38 which is threaded into a friction nut 39 which in turn is threaded to a hub on the cylinder cap 23. The rear end of stem 38 terminates in a hand knob 38a by which the stem may be run in or out on its threads so as to adjust the space 40 between the end of the stem 38 and the rear portion of the piston nut 24. A helical compression spring 41 between the members 38a and 39 surrounds the stem 38 and provides a friction resistance so as to give better adjustment of the knob 38a and its indicator dial presently to be described.

To indicate the adjustment of the knob 38a, a resin fluid indicating dial is slipped on the extension of cylinder cap 23 as indicated and provided with indicia as shown in FIG. 2. A pointer 43 on the knob 38a serves to advise the operator as to what adjustment he has made and serves to reset the same adjustment at any time in the future as desired by the operator. A spring washer 42a maintains friction against dial 42.

Indicator means is also provided to indicate the amount of the threaded adjustment at 34 which limits the movement of the needle valve 33. A sleeve 44 freely surrounds the rear end of the needle valve 33 and is a press fit in the nut 24. Threaded on the rear end of this sleeve is a spacer nut 45 on which is secured an indicator dial 46 provided with indicia as shown in FIG. 2. A pointer 47 on the knob 35 serves to indicate the adjustment of the needle valve in the thread 34 so as to control the lifting of the needle valve from its seat 30 by a predetermined amount.

Means is provided to supply air into the spray at the tip end of the gun simultaneously with the application of air to the cylinder 21 to initiate the spraying action. This comprises a pluraliy of longitudinally extending air passages 48 in the solid portion at the front end of cylinder 21 leading to an annular passage 49. This passage leads to a similar passage in the body 17 where one or more axially extending air passages are provided extending forwardly through the body 17 to a second annular passageway 51 where the junction takes place with the body 10. One or more air passageways 52 are provided through the body 10 leading forwardly and communicating with the space inside the air cap 14. This provides the air which is discharged at the end space 16 between the air cap and fluid tip 12. For controlling the fan or pattern of the spray during operation, a fan screw 53 is provided for controlling a needle valve 54 which controls the inlet of air from the passageway 52 into the air cap.

Suitable sealing means is provided at 55 to prevent the leakage of resin or catalyst along the outer surface of the hollow needle 28. In a like manner suitable sealing means is provided at 56 to prevent the passage of catalyst or air along the outer surface of the hollow needle 28. Other suitable packing is provided at 57 to prevent the leakage of air or catalyst along the outer surface of the needle valve 33.

The operation of the form of device shown in FIGS. 1 and 2 should now be apparent. With a source of resin or other base material connected at 11, with a source of catalyst or other hardening material connected at 20, and with a source of air or other fluid pressure connected at 22, the device is ready to operate. The operator introduces air through the connection 22 by means of a control valve, not shown, thus causing the piston to move rearwardly. The first action of the piston is to lift the needle valve 33 from its seat 30 by means of the threaded connection 34 according to the adjustment set by the knob 35. As soon as the lost motion 37 is taken up, which is almost immediately, the parts 36 and 28a are engaged to pull the hollow needle 28 rearwardly so as to open up the resin flow around the tip end of the needle 28 inside the fluid tip 12. The amount of this opening is set by the adjustment on the hollow stem 38 by means of its knob 38a. This controls the distance 40 which is closed when the nut 24 strikes the stem 38 and controls the inlet of the fluid component entering at 11. Simultaneously with the introduction of air to the cylinder 21, the air flows through the indicated passages to the air cap 14 and emerges at 16 to control the fan or pattern of the air spray which thoroughly intermingles the two fluid components introduced at 11 and 20, respectively. Because the fluid component introduced at 11 needs no catalyst or hardening agent in the pot, it has a long pot life. Because the component introduced at 11 and the catalyst component or hardening agent introduced at 20 are not commingled until they leave the spray gun, there is no problem of the plugging up of the spray gun. Because the needle valve 33 is opened first and closed last, there is no problem of the resin material from 11 clogging up the tip of the gun or being sprayed without the catalyst or hardening component. Because of the power operation of the gun, the lost motion 37 is taken up so quickly that the discharge of the two spray components introduced at 11 and 20 is substantially simultaneous and avoids any problem in case a single one of these components should reach the job alone without being mixed with the other component.

Because of the combination of the pointer 43 and the indicator dial 42 together with the pointer 47 and its indicator dial 46, the operator can quickly make positively indicated adjustments for the flow of the two components or can readily reset a previous adjustment if he has marked down or remembered the dial settings at 42 and 46.

A slightly different embodiment of my invention is shown in FIGS. 3 and 4. Since many of the parts are identical in character and function with those just described, all of such parts have been given identical reference characters with those described in connection with FIGS. 1 and 2 and are understood to have identical functions with those already described in connection with the first form of the invention.

One difference is that the rear end of the needle valve 33' is threaded at 34' into the piston nut 24' in a fixed manner so that it is not adjustable as shown in FIG. 1. Here the adjustment of the catalyst feed through the passageway 20 is provided by means of a connecting tube 60 provided with a reduced passageway 61 through which flow is controlled by a needle valve 62 having a control knob 63. Suitable packing is provided at 64 held in place by the packing nut 65. This provides a control knob 63 right at the gun itself and under the immediate control of the operator so as to adjust the flow of the catalyst through passages 20, 31, 32 and 29 to the tip end of the gun.

The means provided for limiting the rearward movement of the piston in the cylinder comprises a screw 66 threaded into a friction nut 39' which in turn is threaded onto an extension of the cylinder cap 23. This provides an abutment opposite the rear end of the nut 24'. By adjusting this screw the space 67 is adjusted, which limits the rearward movement of the piston when air is supplied to the cylinder 21. An indicator dial 42' like the previously mentioned dial 42 is frictionally held between the nut 39' and a resilient spring washer 42a'. A helical spring 41' creates a friction holding pressure for the screw 66. The head of this screw is provided with a pointer 43' which coacts with the indicia on the dial 42' to indicate the adjustment of the space 67.

In FIG. 4 the operated position of the parts of the device of FIG. 3 is shown. With resin or other base material supplied at 11, with catalyst or other hardening material supplied at 20 and with air supplied at 22 the operator actuates an air valve (not shown) to admit air to the forward end of cylinder 21 and move the piston backwardly. The first movement of the piston lifts the needle valve 33' from the seat 30 permitting catalyst to flow from the passageway 20 to the tip of the gun through the passageway 29. Immediately thereafter, the lost motion 37 is taken up so that the members 36 and 28a engage each other to move the hollow needle 28 to open position for flow of resin out the annular opening 13. Simultaneously with the introduction of air in the cylinder 21, it flows through the passageways 48, 49, 50, 51, 52 into the air cap 14 to be discharged into the sprayed components at 60. This spray or fan pattern is controlled by the fan screw 53 previously described. Upon the discontinuation of the air supply through the connection 22, the spring 27 returns the parts to closed position as shown in FIG. 3. This action was not described in connection with FIG. 1 but the same valve closing action takes place there under the same spring 27.

Obviously, pointers and dial indicators could be used in connection with the adjustments at 63 and 66 if desired.

Another form of my invention is shown in FIGS. 5 and 6. Here the resin fluid body 10 has a central opening communicating with a resin fluid supply passageway 11, a resin fluid tip 12 threaded into the body 10, terminating in a generally circular discharge opening 13, a generally conical shaped air cap 14 held on the body 10 by means of the air cap nut 15, with the air cap nut terminating in a generally circular opening 16 at its forward end, this opening being larger than the forward end of the tip 12 so as to provide an annular space for the discharge of air entirely around the resin fluid tip, all as previously described in connection with FIGS. 1 and 2.

To the rear of the body 10, a cylinder 210 is secured, as by threading the solid body portion 210a to the body 10. This cylinder is provided with an air inlet 220 arranged for the connection of an air hose or the like. The rear end of the cylinder is closed by the threaded cylinder cap 230. This cylinder is fitted with a piston comprising a piston nut 240 having a flange 240a lying on the rear side of the piston leather 250, on the other side of which is a disk 260 which has a hub threaded into the nut 240 so as to firmly hold the leather between them. A helical compression spring 270 lies between the cap 230 and the piston nut 240 so as to urge the piston forwardly when it is released from air pressure in the cylinder.

A central, axially extending cylindrical opening is provided through the bodies 10 and 210a in alignment so as to receive a hollow needle 70. This needle is provided with an axially extending opening 71 of small diameter from the tip end thereof back to a needle valve seat 72, intermediate the ends of the needle. Rearwardly of this point the central opening of the needle is enlarged by means of a hollow sleeve 73 which is permanently secured either as by welding or by a pressed fit to the needle 70. The rear end of this sleeve 73 has a flange 73a extending radially outwardly and fitting with lost motion within a recess 74a formed in a piston extension 74 which is threaded into the piston nut 240. A needle valve 75 axially aligned with the passageway 71 is a press fit in the member 74. A packing gland 76 spring pressed by a spring 77 is provided between the needle valve 75 and the internal hollow of sleeve 73 so as to prevent the leakage of any fluid there. Near the forward end of the needle valve 75 there is provided one or more openings 78 communicating with a hollow central passageway 79 in the needle valve which communicates with a central passageway 74b extending rearwardly through the member 74 at the rear end of which it communicates with a passageway 80 in a valve block 81 which is threaded to the rear end of the member 74. In this valve block is provided a needle valve seat 82 closed by an adjustable needle valve 83 and communicating rearwardly with a connection 84 through which a catalyst may be supplied as presently explained.

Means is provided to limit the rearward movement of the piston so as to control the opening of the needle 70. This is an abutment provided by the hollow stem 85 which is threaded into an extension of the cap 230. This stem is integral with a head 85a which carries a pointer 85b to indicate the setting of the stop shoulder 85c. This indication is given by means of a disk 86 which is threaded on the extension of cap 230 and carries suitable indicia. Once a setting is arrived at it is maintained by means of the friction nut 87 which is threaded on the stem 85. A helical spring 88, in compression between the nut 87 and the head 85a, maintains a frictional resistance so as to give better adjustment of the head or control knob 85a when setting the position of the abutment shoulder 85c.

The means for providing an air supply to the annular opening 16 at the discharge end of the gun is similar to that previously described. This comprises a plurality of longitudinally extending air passages 89 in the cylindrical extension 210a, these passages providing communication from the air pressure chamber in cylinder 210 forwardly to an annular passage 90, whence an additional passageway 91 leads forwardly to communicate with chamber 92 which in turn terminates at the annular discharge opening 16. Control of the air flow from passage 91 to chamber 92 is by means of a manually controlled needle valve 93.

Suitable sealing means is provided at 94 to prevent the leakage of resin along the outer surface of the hollow needle 70.

The operation of the form of device shown in FIG. 5 and FIG. 6 should now be apparent. With a source of resin or other base material connected at 11, with a source of catalyst or other hardening material connected at 84, and with a source of air or other fluid pressure connected at 220, the device is ready to operate. The operator introduces air through the connection 220 by means of a control valve, not shown, thus causing the piston 250 to move rearwardly. The first action of the piston is to lift the needle valve 75 from its seat 72 by means of the rigid connection between members 75 and 240. This causes an initial flow of the catalyst or hardening material from connection 84 through passageways 80, 74b, 79, openings 78, and passageway 71 to the discharge end of the gun. This flow is controlled by means of the adjustable needle valve 83 which is immediately in front of the operator for setting. As soon as the lost motion at 94 is taken up, which is of course almost immediately, the shoulder 240b engages the flange 73a to pull the hollow needle 70 rearwardly so as to open up the resin flow around the tip of the needle 70 inside the fluid tip 12. The amount of this opening is set by the adjustment of the position of the hollow stem 85 by means of the control head 85a. When the flange 74c of the piston extension 74 strikes the shoulder abutment 85c of the hollow stem 85, the rearward movement of the piston 250 is stopped and this gives a controlled opening for the flow of resin at the discharge end of the gun. Simultaneously with the introduction of air to the interior of cylinder 210, the air flows through the indicated passages to the air cap 14 and emerges at 16 to control the fan or pattern of the air spray which thoroughly intermingles with the fluid components introduced at 11 and 84, respectively.

This form of my invention in FIGS. 5 and 6 has all of the advantages of the previously described forms so that they need not be repeated here. Because the adjustable head 85a and the adjustable needle 83 are at the rear end of the gun and immediately available to the operator, he can quickly make positively indicated adjustments for the flow of the two components so as to obtain an exactly controlled mixture at the discharge end of the gun.

What is claimed is:

1. A multi-fluid spray gun comprising a body having an open tip end and a central longitudinally extending opening from said tip end rearwardly, a hollow needle extending through said central opening, there being a chamber in said body near said tip end and having walls terminating in an annular opening surrounding said needle at said tip end and there providing an annular seat for said needle, sealing means between said needle and said chamber, said needle movable longitudinally in its associated opening to selectively close and open said annular opening, there being a first supply passageway in said body communicating with said chamber for the supply of a first fluid thereto, there being a second supply passageway in said body and through the wall of said needle for the supply of a second fluid to the hollow of said needle, a needle valve extending centrally and longitudinally from said second supply passageway rearwardly, a valve seat in said needle at the rear end of the hollow thereof and axially opposite said needle valve, said needle valve movable longitudinally of said hollow needle selectively to seat-closing and seat-opening position, a needle valve actuator operatively connected with the rear end of said needle valve, there being a lost-motion connection between said actuator and said hollow needle the lost-motion of which is adapted to be taken up by slight opening movement of said needle actuator, adjustable stop means on said gun for limiting opening movement of said needle, and means for causing quick opening movement of said needle valve and needle in that order.

2. A spray gun as in claim 1 including means on said gun for controlling the flow through said needle valve.

3. A spray gun as in claim 1 wherein said needle valve passes through said actuator to the rear end of said gun and has a threaded connection with said actuator, and means at the rear end of said needle valve for adjusting said threaded connection, whereby a fixed ratio is maintained between the amounts of said first and second fluid discharged from the gun.

4. A spray gun as in claim 1 wherein said actuator is a power means.

5. A spray gun as in claim 1 wherein said last named means is a cylinder and piston motor including a cylinder rigidly connected at the rear end of said gun, a piston reciprocatable in said cylinder at the rear end thereof, means for admitting air to the forward end of said cylinder to drive said piston rearwardly, spring means operatively connected with said piston to urge it forwardly, a hollow air cap at the tip of said gun closed except for an annular opening surrounding said chamber walls defining said first named annular opening, there being air passage means connecting the hollow of said air cap with the forward end of said cylinder, whereby admission of air to said cylinder causes opening of said needle valve quickly followed by opening movement of said hollow needle and simultaneously air is discharged from said last named annular opening.

6. The combination of claim 5 wherein said adjustable stop means comprises a hollow stem threaded into the rear end of said cylinder and abutting said piston, said needle valve passing freely through the hollow of said stem, and means for adjusting the position of said stem at the rear end thereof.

7. The combination of claim 6 wherein said needle valve passes through said piston and has a threaded connection therewith, and means at the rear end of said needle valve for adjusting said threaded connection, whereby a fixed ratio is maintained between the amounts of said first and second fluids discharged from the gun.

8. A multi-fluid spray gun comprising a body having an open tip end and a central longitudinally extending opening from said tip end rearwardly, a hollow needle extending through said central opening, there being a chamber in said body near said tip end and having walls terminating in an annular opening surrounding said needle at said tip end and there providing an annular seat for said needle, sealing means between said needle and said chamber, said needle movable longitudinally in its associated opening to selectively close and open said annular opening, there being a first supply passageway in said body communicating with said chamber for the supply of a first fluid thereto, there being a second supply passageway in said body communicating with the hollow of said needle for the supply of a second fluid to the hollow of said needle, a valve seat in said needle intermediate its ends and communicating with the hollow thereof, a needle valve axially opposite said last named seat and movable to open and closed positions relative to said seat, a needle valve actuator operatively connected with the rear end of said needle valve, there being a lost-motion connection between said actuator and said hollow needle the lost-motion of which is adapted to be taken up by slight opening movement of said needle actuator, adjustable stop means on said gun for limiting opening movement of said needle, and means for causing quick opening movement of said needle valve and needle in that order.

9. The combination of claim 8 wherein said last named means includes an air-operated abutment operatively connected with said needle valve actuator, there being an air chamber in said body contiguous to said abutment, means for supplying air under pressure to said air chamber, air orifice means radially outside said open tip end, and a passageway communicating between said air chamber and said air orifice.

10. A multi-fluid spray gun comprising a body having an open tip end and a central longitudinally extending opening from said tip end rearwardly, a hollow needle extending through said central opening, there being a chamber in said body near said tip end and having walls terminating in an annular opening surrounding said needle at said tip end and there providing an annular seat for said needle, said hollow needle having its discharge end extending through said seat and forward beyond said seat, sealing means between said needle and said chamber, said needle movable longitudinally in its associated opening to selectively close and open said annular opening, there being a first supply passageway in said body communicating with said chamber for the supply of a first fluid thereto, there being a second supply passageway in said body communicating with the hollow of said needle for the supply of a second fluid to the hollow of said needle, a needle valve extending centrally and longitudinally within said needle, a valve seat in said needle in the hollow thereof and axially opposite said needle valve, said needle valve movable longitudinally of said hollow needle selectively to seat-closing and seat-opening position, a needle valve actuator operatively connected with said needle valve, and means for causing quick opening movement of said needle valve and needle in that order.

References Cited in the file of this patent

UNITED STATES PATENTS

| 2,401,503 | Paasche | June 4, 1946 |
| 2,907,527 | Cummings | Oct. 6, 1959 |
| 2,958,471 | Zippel | Nov. 1, 1960 |

FOREIGN PATENTS

| 566,543 | Great Britain | Jan. 3, 1945 |